United States Patent
Chan et al.

(10) Patent No.: US 8,238,680 B2
(45) Date of Patent: Aug. 7, 2012

(54) IMAGE COMPRESSION METHOD WITH VARIABLE QUANTIZATION PARAMETERS AND VARIABLE CODING PARAMETERS

(75) Inventors: Chen-Hung Chan, Taoyuan County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 292 days.

(21) Appl. No.: 12/823,885

(22) Filed: Jun. 25, 2010

(65) Prior Publication Data

US 2011/0317932 A1 Dec. 29, 2011

(51) Int. Cl.
*G06K 9/00* (2006.01)
*G06K 9/36* (2006.01)

(52) U.S. Cl. ........................ 382/251; 382/238
(58) Field of Classification Search .......... 382/232–253; 375/240.01–240.29
See application file for complete search history.

(56) References Cited

U.S. PATENT DOCUMENTS

| | | | | |
|---|---|---|---|---|
| 6,167,086 A * | 12/2000 | Yu et al. | ..................... | 375/240.03 |
| 6,233,355 B1 * | 5/2001 | Kajiwara | ...................... | 382/238 |
| 6,266,449 B1 * | 7/2001 | Ohsawa | ...................... | 382/239 |
| 6,993,197 B2 * | 1/2006 | Cho et al. | ....................... | 382/238 |
| 7,079,693 B2 * | 7/2006 | Kerofsky | ...................... | 382/233 |
| 8,045,814 B2 * | 10/2011 | Odagiri et al. | ................ | 382/238 |
| 2011/0299790 A1 * | 12/2011 | Chan et al. | ..................... | 382/239 |

* cited by examiner

*Primary Examiner* — Ishrat I Sherali
(74) *Attorney, Agent, or Firm* — Morris Manning & Martin LLP; Tim Tingkang Xia, Esq.

(57) ABSTRACT

An image compression method is used for processing a plurality of pixels of an image. The image compression method includes the steps of receiving N pixels; analyzing the N pixels and generating a content type corresponding to the N pixels; obtaining a quantization parameter and a coding parameter corresponding to the N pixels according to the content type and a currently available buffer space value; obtaining N quantized differences corresponding to the N pixels through a prediction and quantization way according to values of the N pixels and the quantization parameter; and encoding the N quantized differences according to the N quantized differences and the coding parameter.

9 Claims, 7 Drawing Sheets

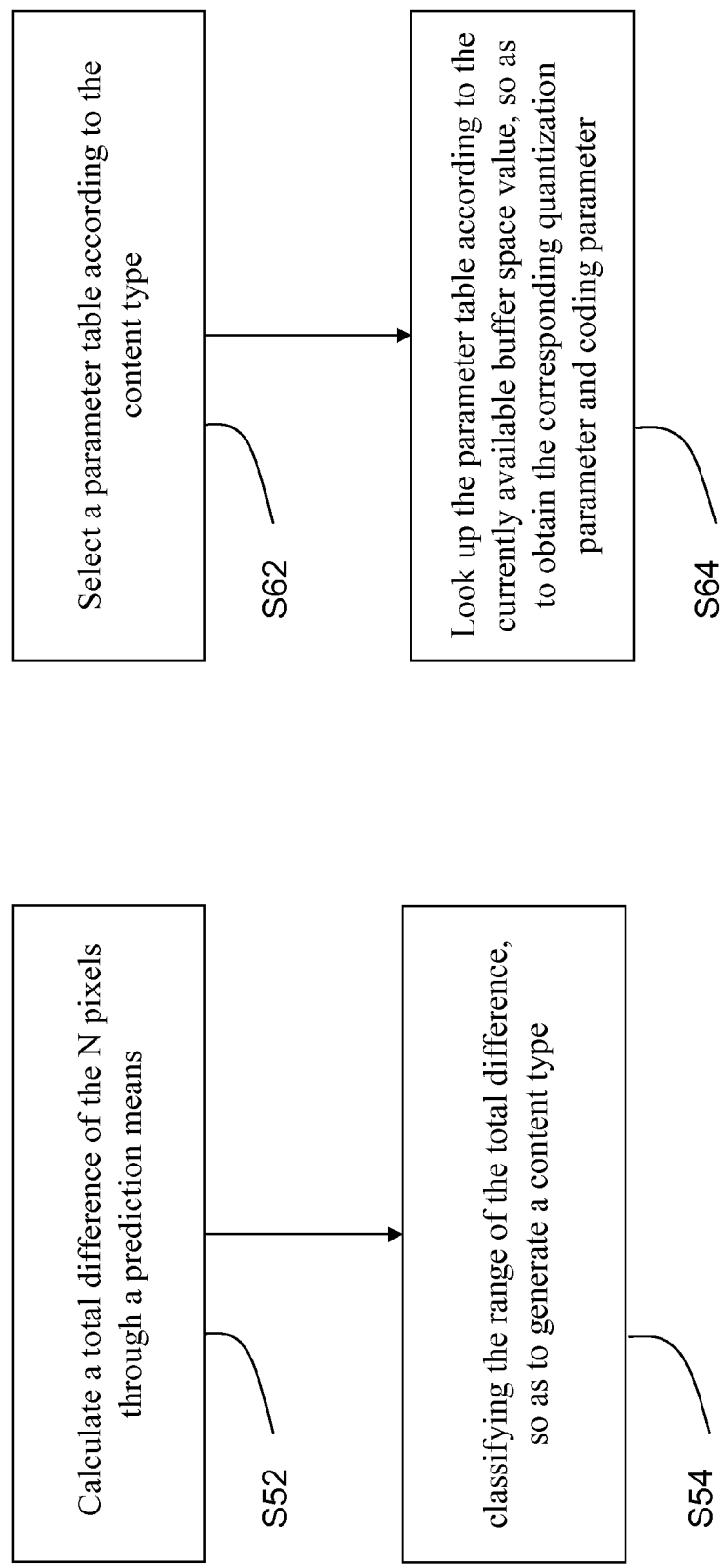

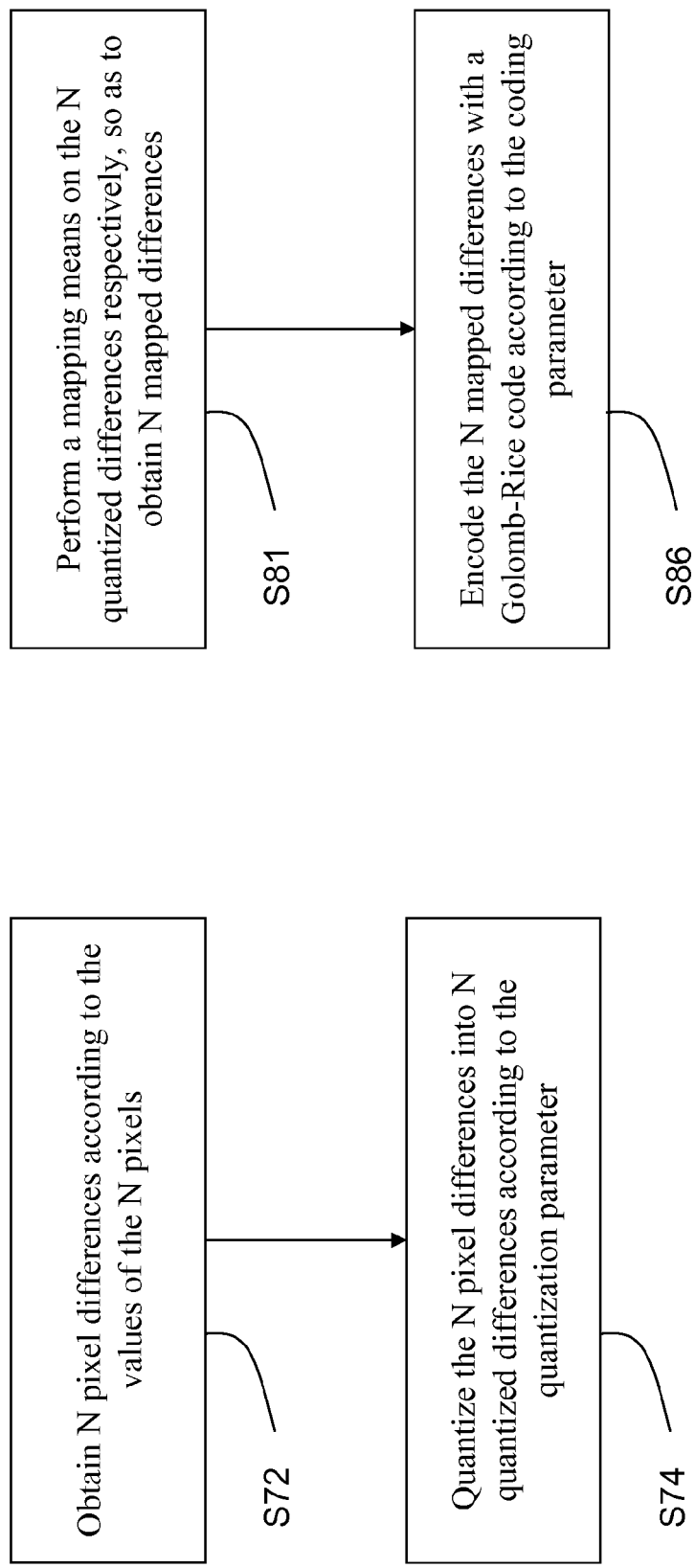

IMAGE COMPRESSION METHOD WITH VARIABLE QUANTIZATION PARAMETERS AND VARIABLE CODING PARAMETERS

BACKGROUND OF THE INVENTION

1. Field of Invention

The present invention relates to an image compression method with variable quantization parameters and variable coding parameters, and more particularly to an image compression method with variable quantization parameters which requires less memory space.

2. Related Art

A conventional encoder adopts a prediction method such as context modeling, which needs to at least buffer a whole row of pixels of an image so as to perform prediction in various modes. Therefore, the conventional encoder requires a large amount of storage space, resulting in an increased cost thereof. Furthermore, the conventional encoder must perform a compression test on each mode when making a selection from various modes, till the encoding result is in line with expectation. Therefore, the computation is complicated, and the encoder requires different time for each processing.

In addition, request of users for higher and higher image resolutions aggravates the burden on image compression. If a conventional compression method is adopted, once the image resolution is enhanced, the encoder needs to consume a larger amount of storage space to store a whole row of pixels in an image for image compression.

SUMMARY OF THE INVENTION

In one aspect, the present invention relates to an image compression method with variable quantization parameters and variable coding parameters, for processing a plurality of pixels of an image. The image compression method with the variable quantization parameters and the variable coding parameters comprises: receiving N pixels; analyzing the N pixels and generating a content type corresponding to the N pixels; obtaining a quantization parameter and a coding parameter corresponding to the N pixels according to the content type and a currently available buffer space value; obtaining N quantized differences corresponding to the N pixels through a prediction and quantization means according to values of the N pixels and the quantization parameter; and encoding the N quantized differences according to the N quantized differences and the coding parameter.

In order to compress the image, the image compression method with the variable quantization parameters and the variable coding parameters may further comprise: continuously receiving and encoding the other pixels of the image in a unit of N till all the pixels of the image are compressed.

The step of analyzing the N pixels and generating a content type corresponding to the N pixels may comprise: calculating a total difference of the N pixels through a prediction means; and classifying the range of the total difference, so as to generate the content type.

The step of obtaining a quantization parameter and a coding parameter corresponding to the N pixels according to the content type and the currently available buffer space value may comprise: selecting one parameter table from a plurality of parameter tables according to the content type; and looking up the parameter table according to the currently available buffer space value, so as to obtain the quantization parameter and the coding parameter corresponding to the currently available buffer space value.

According to an embodiment of the present invention, the prediction and quantization means may comprise: obtaining N pixel differences respectively corresponding to the N pixels according to the values of the N pixels; and quantizing the N pixel differences into the N quantized differences respectively corresponding to the N pixel differences according to the quantization parameter.

The step of obtaining N pixel differences respectively corresponding to the N pixels according to the values of the N pixels may comprise: calculating a difference between a value $P_i$ of the $i^{th}$ pixel and a value $P_{i-1}$ of the previous pixel in the N pixels to serve as the N pixel differences $d_1$-$d_{N-1}$ respectively, where i is a positive integer, and $0 \leq i < N$.

According to an embodiment of the present invention, the step of encoding the N quantized differences according to the N quantized differences and the coding parameter may comprise: performing a mapping means on the N quantized differences respectively, so as to obtain N mapped differences respectively corresponding to the N quantized differences; and encoding the N mapped differences with a Golomb-Rice code (GR code) according to the coding parameter.

The mapping means may comprise: when the $i^{th}$ quantized difference $x_i$ in the N quantized differences is greater than or equal to 0, obtaining the corresponding $i^{th}$ mapped difference $n_i$ by multiplying the quantized difference $x_i$ by 2, where $0 <= i < N$; and when the $i^{th}$ quantized difference $x_i$ in the N quantized differences is smaller than 0, obtaining the corresponding $i^{th}$ mapped difference $n_i$ by subtracting 1 from a product of the quantized difference $x_i$ and 2.

N is a positive integer greater than or equal to 2, and is smaller than an image width of the image. Furthermore, the image compression method with the variable quantization parameters and the variable coding parameters can be performed by a microprocessor.

To sum up, in the image compression method with the variable quantization parameters and the variable coding parameters, N pixels in the image are received and content of the N pixels is analyzed. Since the quantization parameter and the coding parameter are determined according to a type corresponding to the N pixels and the currently available buffer space value, the suitable quantization parameter and the suitable coding parameter can be obtained for every N pixels in the image. Furthermore, a buffer of the encoder only needs to store the values of the N pixels, thereby saving a large amount of buffer space.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 4 is a flow chart of Step S50 according to an embodiment of the present invention;

FIG. 5 is a flow chart of Step S60 according to an embodiment of the present invention;

FIG. 6 is a flow chart of Step S70 according to an embodiment of the present invention;

FIG. 7 is a flow chart of Step S80 according to an embodiment of the present invention;

DETAILED DESCRIPTION OF THE INVENTION

The detailed features and advantages of the present invention are described below in great detail through the following embodiments, and the content of the detailed description is sufficient for those skilled in the art to understand the technical content of the present invention and to implement the present invention accordingly. Based upon the content of the specification, the claims, and the drawings, those skilled in the art can easily understand the relevant objectives and advantages of the present invention.

The present invention relates to an image compression method with variable quantization parameters and variable coding parameters, for processing a plurality of pixels of an image to compress the image. The image compression method with the variable quantization parameters and the variable coding parameters can assign a suitable quantization parameter and a suitable coding parameter to a part of pixels in the image according to characteristics thereof, so as to retain the features of the image appropriately. The image compression method with the variable quantization parameters and the variable coding parameters can be implemented in an encoder, and can be performed by a microprocessor.

Figure 1:
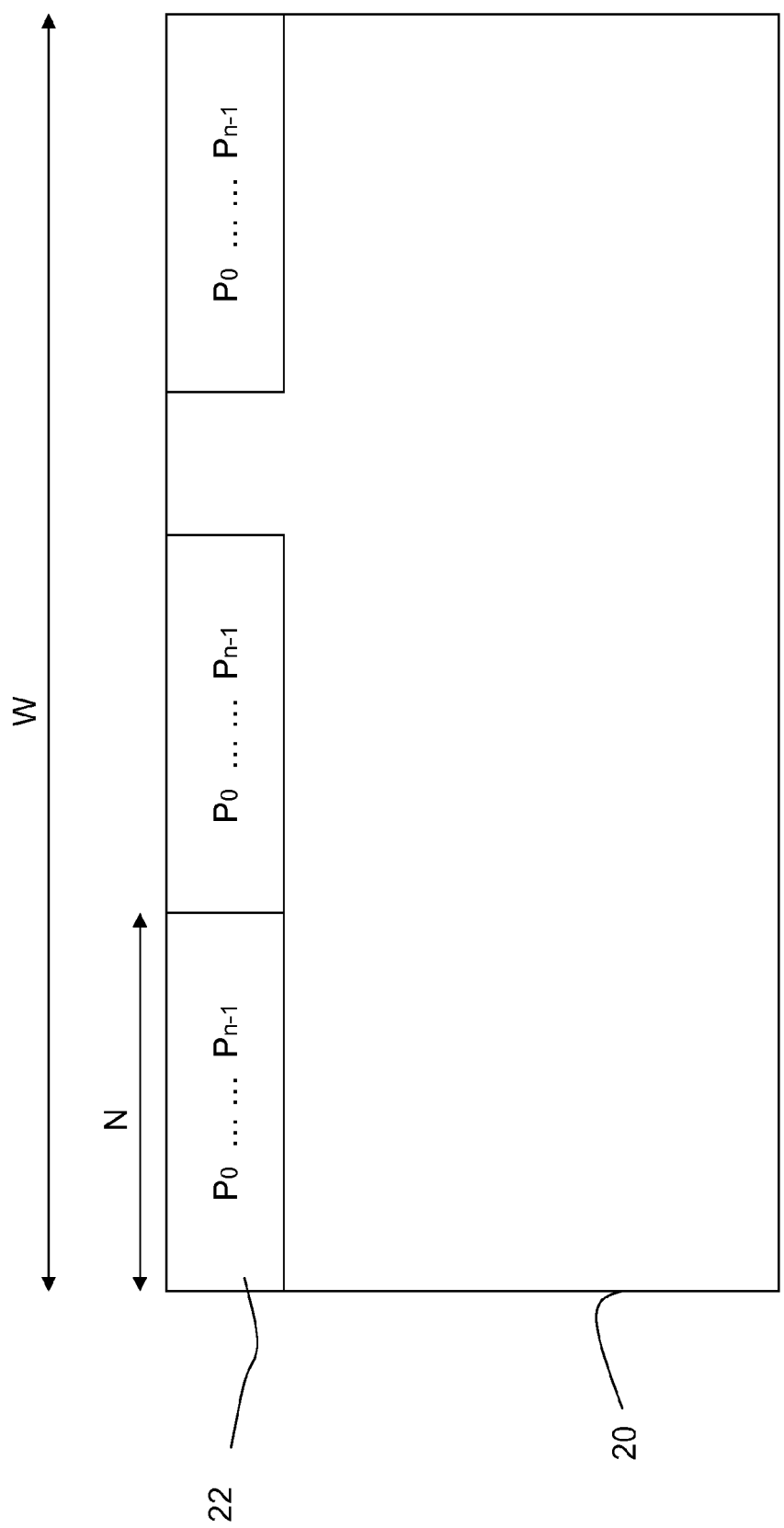
FIG. 1 is a schematic view of an image according to an embodiment of the present invention.

FIG. 1 is a schematic view of an image according to an embodiment of the present invention. Referring to FIG. 1, an image 20 has W×L pixels, where W is an image width and L is an image length of the image 20. For example, the image 20 may have 640×480 pixels or 128×128 pixels, and the image width W is 640 (pixels) or 128 (pixels).

The image compression method with the variable quantization parameters and the variable coding parameters can select N pixels once and buffer them for processing. The step of selecting N pixels can be implemented with a processing window 22. The processing window 22 has a length of N, and the N pixels selected by the processing window 22 are N pixels processed by the image compression method with the variable quantization parameters and the variable coding parameters.

Figure 2:
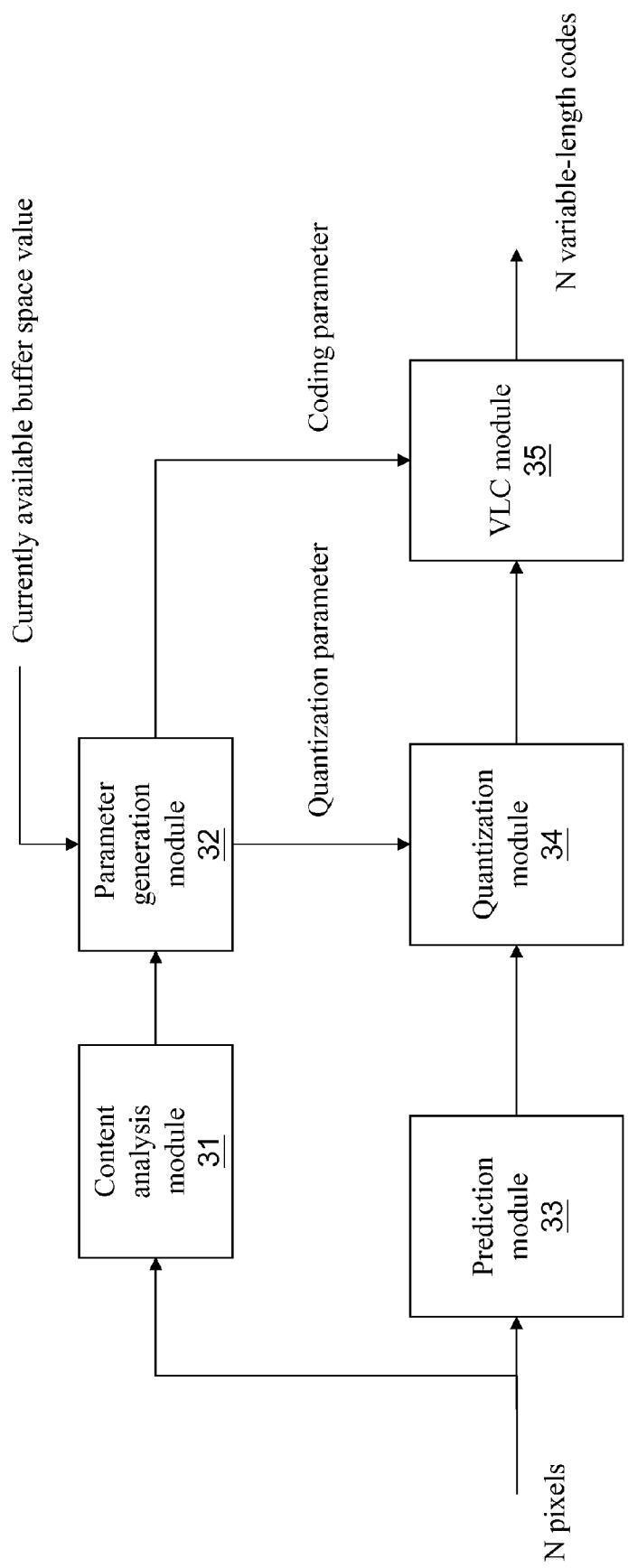
FIG. 2 is a schematic view of an encoder according to an embodiment of the present invention.
Figure 3:
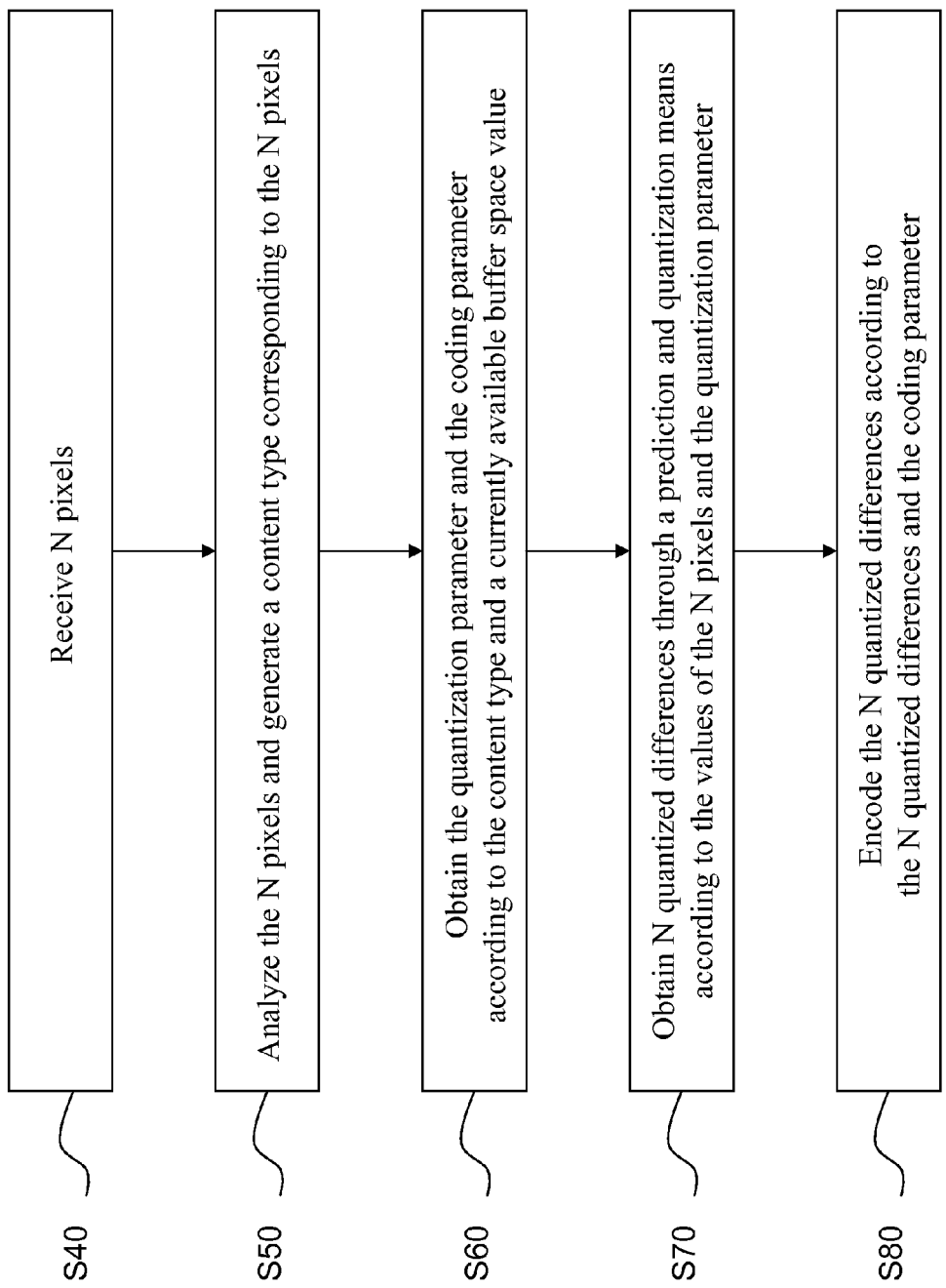
FIG. 3 is a flow chart of an image compression method with variable quantization parameters and variable coding parameters according to an embodiment of the present invention.

FIGS. 2 and 3 are respectively a schematic view of an encoder and a flow chart of an image compression method with variable quantization parameters and variable coding parameters according to an embodiment of the present invention. As shown in FIG. 2, the encoder may comprise a content analysis module 31, a parameter generation module 32, a prediction module 33, a quantization module 34, and a Variable-Length Coding (VLC) module 35.

In the image compression method with the variable quantization parameters and the variable coding parameters, firstly, N pixels are received (Step S40). The N pixels can be selected from the image 20 and received. More specifically, the image 20 may be a file stored in a memory (not shown), or image data transmitted by a photosensitive unit of an image capturing device. Therefore, after the N pixels are selected from the image 20 received by the memory or the photosensitive unit, values of the N pixels $P_0$-$P_{N-1}$ can be received directly. The values of the pixels may be, for example, grayscale values, RGB values, or hue, saturation, and lightness of an HSL color space. The image compression method with the variable quantization parameters does not limit the content of the values of the pixels.

When the image 20 is compressed by the image compression method with the variable quantization parameters, only the N pixels of the processing window 22 are used, and the other pixels in the image 20 are not required. Therefore, a buffer (not shown) of the encoder only needs to store the N pixels, instead of the W pixels in the whole row of the image 20. N is a positive integer greater than or equal to 2, and is smaller than the image width W.

The N pixels are supplied to the content analysis module 31 and the prediction module 33. In order to obtain a quantization parameter and a coding parameter suitable for the N pixels, the content analysis module 31 analyzes the N pixels and generates a content type corresponding to the N pixels (Step S50).

FIG. 4 is a flow chart of Step S50 according to an embodiment of the present invention. Referring to FIG. 4, the content analysis module 31 firstly generates N predicted differences according to the values of the N pixels $P_0$-$P_{N-1}$ through a prediction means, and calculates a sum of the N predicted differences as a total difference (Step S52). Then, classification is performed according to the total difference, so as to generate the content type (Step S54).

The content analysis module 31 can store a content type comparison table. The content analysis module 31 can look up the table according to a range of the total difference, and obtain the content type corresponding to the N pixels.

After obtaining the content type from the content analysis module 31, the parameter generation module 32 obtains the quantization parameter and the coding parameter corresponding to the N pixels according to the content type and a currently available buffer space value (Step S60). The currently available buffer space value represents a size of the remaining space of an external system which varies with the compression process.

FIG. 5 is a flow chart of Step S60 according to an embodiment of the present invention. Referring to FIG. 5, one parameter table is selected from a plurality of parameter tables according to the content type (Step S62). The parameter generation module 32 looks up the parameter table selected in Step S62 according to the currently available buffer space value, so as to obtain the quantization parameter and the coding parameter corresponding to the content type and the currently available buffer space value (Step S64).

More specifically, the parameter generation module 32 stores the plurality of parameter tables respectively corresponding to each content type. A predicted difference range covered by the N pixels depends on the parameter table looked up in Step S64. Parameter tables corresponding to each index record quantization parameters and coding parameters suitable for the N pixels under different currently available buffer space values. The quantization parameter and coding parameter obtained by looking up the tables are respectively transmitted to the quantization module 34 and the VLC module 35 for subsequent quantization and encoding.

An embodiment of the parameter tables is provided as follows.

| Currently available buffer space value | Quantization parameter | Coding parameter |
| --- | --- | --- |
| 256 | 0 | 4 |
| 128 | 1 | 3 |
| 96 | 2 | 2 |
| 64 | 4 | 1 |
| 32 | 8 | 0 |
| 16 | 16 | 0 |
| 8 | 32 | 0 |

After the parameter table being selected by the parameter generation module 32 according to the content type in Step S62, the corresponding quantization parameter and coding parameter can be obtained by looking up the table according to the currently available buffer space value. The obtained quantization parameter and coding parameter are the most suitable values taking both the image characteristics of the N pixels and the currently available buffer space value into account. After receiving the quantization parameter corresponding to the N pixels, the quantization module 34 obtains N quantized differences $x_0$-$x_{N-1}$ corresponding to the N pixels through a prediction and quantization means according to the values of the N pixels $P_0$-$P_{N-1}$ and the quantization parameter (Step S70).

FIG. 6 is a flow chart of S70 according to an embodiment of the present invention.

Referring to FIG. 6, firstly, the prediction module 33 can obtain N pixel differences $d_0$-$d_{N-1}$ respectively corresponding to the N pixels according to the values of the N pixels $P_0$-$P_{N-1}$ (Step S72). Then, the quantization module 34 quantizes the N pixel differences $d_0$-$d_{N-1}$ into N quantized differences $x_0$-$x_{N-1}$ respectively corresponding to the N pixel differences according to the quantization parameter (Step S74).

In Step S72, the prediction module 33 can respectively calculate a difference between a value $P_i$ of the $i^{th}$ pixel and a value $P_{i-1}$ of the previous pixel in the N pixels to serve as the pixel difference, where i is a positive integer, and $0 \leq i < N$. In other words, the prediction module 33 can calculate to obtain the pixel differences $d_0$-$d_{N-1}$ according to Formula 1:

$$d_i = P_i - P_{i-1}, \text{ where } 0 \leq i < N, \text{ and } i \text{ is a positive integer} \quad \text{Formula 1}$$

where $P_i$ is the value of the $i^{th}$ pixel in the N pixels in the processing window 22, and $d_i$ is the pixel difference corresponding to $P_i$.

After obtaining the N pixel differences $d_0$-$d_{N-1}$, the quantization module 34 quantizes the N pixel differences $d_0$-$d_{N-1}$ into the N quantized differences $x_0$-$x_{N-1}$ according to the quantization parameter obtained from the parameter generation module 32.

Then, the VLC module 35 encodes the N quantized differences $x_0$-$x_{N-1}$ according to the N quantized differences $x_0$-$x_{N-1}$ and the coding parameter (Step S80). The VLC module 35 receives the N quantized differences $x_0$-$x_{N-1}$ from the quantization module 34, and receives the coding parameter from the parameter generation module 32.

FIG. 7 is a flow chart of Step S80 according to an embodiment of the present invention. Referring to FIG. 7, the VLC module 35 performs a mapping means on the received N quantized differences $x_0$-$x_{N-1}$ respectively, so as to obtain N mapped differences $n_0$-$n_{N-1}$ respectively corresponding to the N quantized differences $x_0$-$x_{N-1}$ (Step S81).

Figure 8:
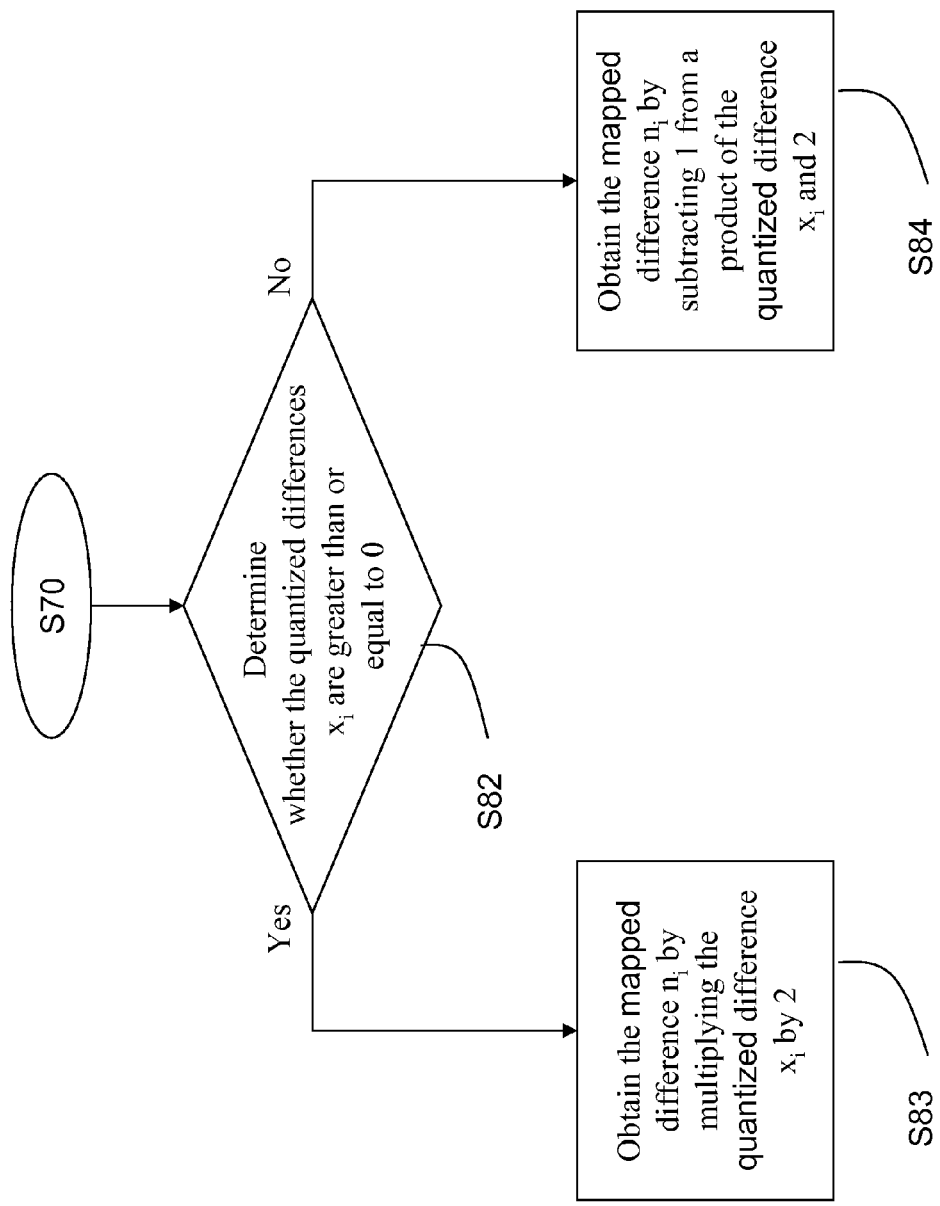
FIG. 8 is a flow chart of a mapping means according to an embodiment of the present invention.

FIG. 8 is a flow chart of the mapping means according to an embodiment of the present invention. Referring to FIG. 8, the mapping means can firstly determine whether the quantized differences $x_i$ are greater than or equal to 0 one by one (Step S82), and then calculate to obtain the mapped differences $n_0$-$n_{N-1}$ according to Formulas 2 and 3:

$$n_i = 2 \times x_i, \text{ if } x_i \geq 0 \quad \text{Formula 2}$$

$$n_i = 2 \times x_i - 1, \text{ if } x_i < 0 \quad \text{Formula 3}$$

where $n_i$ is a value of the $i^{th}$ pixel in the N mapped differences $n_0$-$n_{N-1}$, and $0 \leq i < N$.

For the quantized difference $x_i$ greater than or equal to 0, in Formula 2, a value obtained by multiplying the quantized difference $x_i$ by 2 is taken as the mapped difference $n_i$. That is to say, the mapped difference $n_i$ is obtained by multiplying the quantized difference $x_i$ by 2 (Step S83). For the quantized difference $x_i$ smaller than 0, in Formula 3, a value obtained by subtracting 1 from a product of the quantized difference $x_i$ and 2 is taken as the mapped difference $n_i$. That is to say, the mapped difference $n_i$ is obtained by subtracting 1 from a product of the quantized difference $x_i$ and 2 (Step S84).

In this way, the N mapped differences $n_0$-$n_{N-1}$ corresponding to the N pixels can be obtained according to the N quantized differences $x_i$ in Step S81.

Referring to FIG. 7 again, the VLC module 35 then encodes the N mapped differences $n_0$-$n_{N-1}$ with a Golomb-Rice code (GR code) according to the coding parameter (Step S86).

According to the GR code, the VLC module 35 sets a divisor m according to the coding parameter k. Then, the N mapped differences $n_0$-$n_{N-1}$ are divided by the divisor m, so as to obtain N corresponding quotients Q and remainders R. The divisor m is the kth power of 2, $2^k$. The VLC module 35 then encodes the obtained quotients Q into unary codes, and encodes the remainders R into binary codes of k-bit length.

For example, if the mapped difference $n_0$ is 163 and the coding parameter k is 5, the quotient Q of the mapped difference $n_0$ is 5, and the remainder R is 3. Thus, the quotient Q of the mapped difference $n_0$ can be encoded into 111110 with a unary code, and the remainder R can be encoded into 00011 with a binary code.

Figure 9:
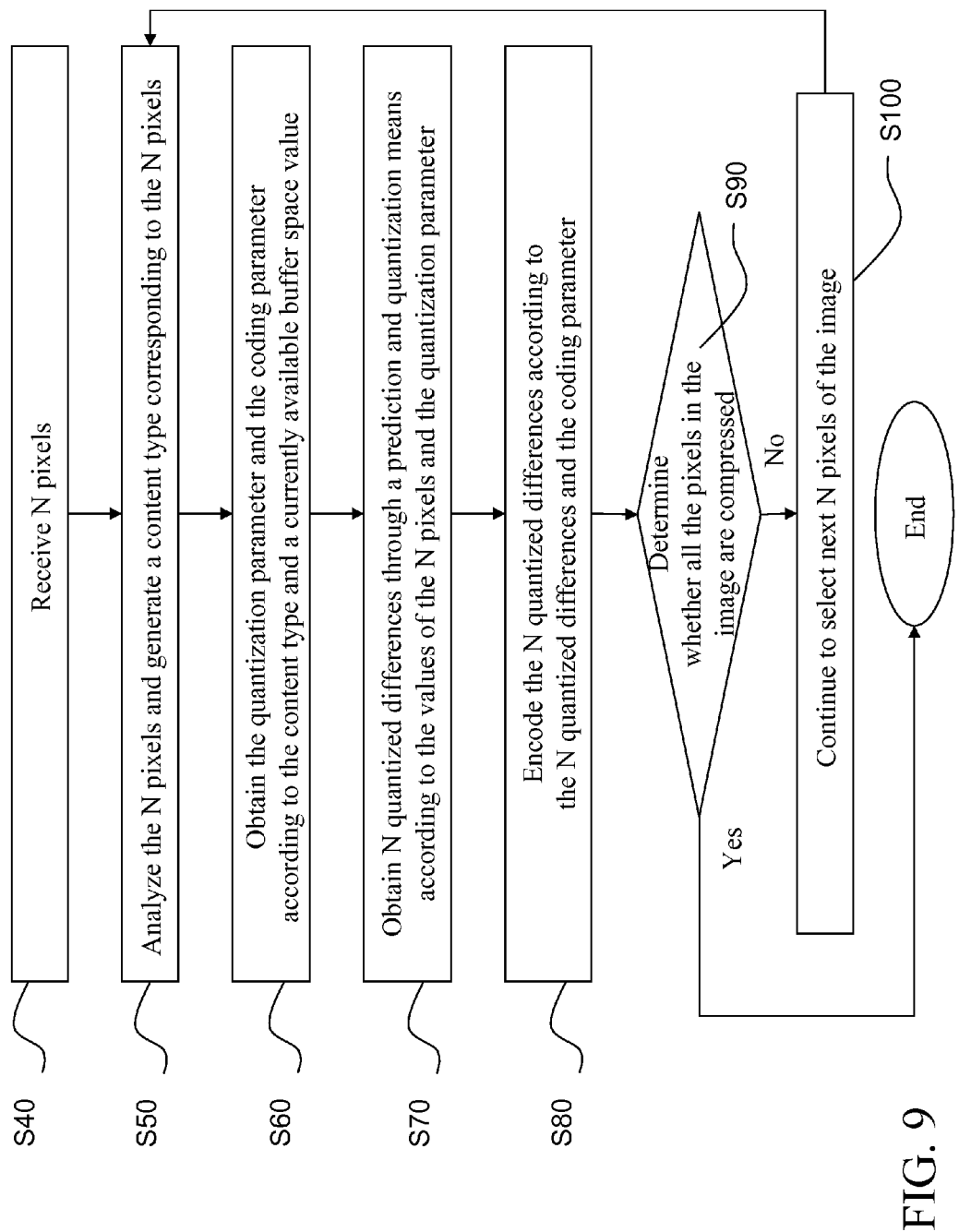
FIG. 9 is a flow chart of an image compression method with variable quantization parameters and variable coding parameters according to another embodiment of the present invention.

In this way, the values $P_0$-$P_{N-1}$ of the N pixels in the processing window 22 can be converted into variable-length codes according to the quantization parameter and the coding parameter. The whole image 20 can be compressed by the image compression method with the variable quantization parameters and the variable coding parameters. FIG. 9 is a flow chart of an image compression method with variable quantization parameters and variable coding parameters according to another embodiment of the present invention.

Referring to FIG. 9, after Steps S40 to S80 are performed to compress the N pixels of the processing window 22, it can be determined whether all the pixels in the image 20 are compressed (Step S90). If the image 20 has not been completely compressed, selection of next N pixels of the image 20 is continued (Step S100), and the N pixels selected in Step S100 are processed according to Steps S50, S60, S70, and S80. If the image 20 has been compressed into a compressed image file, the process can be ended. That is to say, the mage compression method with the variable quantization parameters and the variable coding parameters continues to select additional N pixels subsequent to the N pixels selected in Step S40, and processes the additionally selected N pixels as a new processing window 22.

To sum up, in the image compression method with the variable quantization parameters and the variable coding parameters according to the present invention, N pixels in the image are received, and the content of the N pixels is analyzed. A content type is obtained according to values of the N pixels, and the quantization parameter and the coding parameter suitable for the N pixels can be obtained in combination with the currently available buffer space value, and used for image compression. Since the content type is determined by a total of predicted differences of the N pixels, the suitable quantization parameter and the suitable coding parameter can be obtained for every N pixels in the image. Furthermore, a buffer of the encoder only needs to store the values of the N pixels, thereby saving a large amount of buffer space.

What is claimed is:

1. An image compression method with variable quantization parameters and variable coding parameters, for processing a plurality of pixels of an image, comprising:
   receiving N pixels;
   analyzing the N pixels and generating a content type corresponding to the N pixels;
   obtaining a quantization parameter and a coding parameter corresponding to the N pixels according to the content type and a currently available buffer space value;
   obtaining N quantized differences corresponding to the N pixels through a prediction and quantization means according to values of the N pixels and the quantization parameter; and
   encoding the N quantized differences according to the N quantized differences and the coding parameter.

2. The image compression method with the variable quantization parameters and the variable coding parameters according to claim 1, further comprising:
   receiving and encoding the other pixels of the image in a unit of N continuously till all the pixels of the image are compressed.

3. The image compression method with the variable quantization parameters and the variable coding parameters according to claim 1, wherein the step of analyzing the N pixels and generating a content type corresponding to the N pixels comprises:
   calculating a total difference of the N pixels through a prediction means; and
   classifying the range of the total difference, so as to generate the content type.

4. The image compression method with the variable quantization parameters and the variable coding parameters according to claim 1, wherein the step of obtaining the quantization parameter and the coding parameter corresponding to the N pixels according to the content type and the currently available buffer space value comprises:
   selecting one parameter table from a plurality of parameter tables according to the content type; and
   looking up the parameter table according to the currently available buffer space value, so as to obtain the quantization parameter and the coding parameter corresponding to the content type and the currently available buffer space value.

5. The image compression method with the variable quantization parameters and the variable coding parameters according to claim 1, wherein the prediction and quantization means comprises:
   obtaining N pixel differences respectively corresponding to the N pixels according to the values of the N pixels; and
   quantizing the N pixel differences into the N quantized differences respectively corresponding to the N pixel differences according to the quantization parameter.

6. The image compression method with the variable quantization parameters and the variable coding parameters according to claim 5, wherein the step of obtaining the N pixel differences respectively corresponding to the N pixels according to the values of the N pixels comprises:
   calculating a difference between a value $P_i$ of the $i^{th}$ pixel and a value $P_{i-1}$ of the previous pixel in the N pixels to serve as the N pixel differences respectively, where i is a positive integer, and $0 \leq i < N$.

7. The image compression method with the variable quantization parameters and the variable coding parameters according to claim 1, wherein the step of encoding the N quantized differences according to the N quantized differences and the coding parameter comprises:
   performing a mapping means on the N quantized differences respectively, so as to obtain N mapped differences respectively corresponding to the N quantized differences; and
   encoding the N mapped differences with a Golomb-Rice code according to the coding parameter.

8. The image compression method with the variable quantization parameters and the variable coding parameters according to claim 7, wherein the mapping means comprises:
   when the $i^{th}$ quantized difference $x_i$ in the N quantized differences is greater than or equal to 0, obtaining the corresponding $i^{th}$ mapped difference $n_i$ by multiplying the quantized difference $x_i$ by 2, where $0 <= i < N$; and
   when the $i^{th}$ quantized difference $x_i$ in the N quantized differences is smaller than 0, obtaining the corresponding $i^{th}$ mapped difference $n_i$ by subtracting 1 from a product of the quantized difference $x_i$ and 2.

9. The image compression method with the variable quantization parameters and the variable coding parameters according to claim 1, performed by a microprocessor.

* * * * *